(12) United States Patent
Gopalakrishnan et al.

(10) Patent No.: US 10,108,402 B2
(45) Date of Patent: Oct. 23, 2018

(54) PERSISTENT POINTERS FOR PROGRAMS RUNNING ON NVRAM BASED COMPUTERS

(71) Applicants: HEWLETT-PACKARD DEVELOPMENT COMPANY, L.P., Houston, TX (US); Shyam Sankar Gopalakrishnan, Karnataka (IN); Pramod Kumar Mangalore, Karnataka (IN); Prashanth K E, Karnataka (IN); Sandesh V Madhyastha, Karnataka (IN)

(72) Inventors: Shyam Sankar Gopalakrishnan, Bangalore (IN); Pramod Kumar Mangalore, Bangalore (IN); Prashanth K E, Bangalore (IN); Sandesh V Madhyastha, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 153 days.

(21) Appl. No.: 15/114,370

(22) PCT Filed: Jan. 30, 2014

(86) PCT No.: PCT/IN2014/000075
§ 371 (c)(1),
(2) Date: Jul. 26, 2016

(87) PCT Pub. No.: WO2015/114644
PCT Pub. Date: Aug. 6, 2015

(65) Prior Publication Data
US 2016/0342399 A1 Nov. 24, 2016

(51) Int. Cl.
*G06F 9/44* (2018.01)
*G06F 9/45* (2006.01)
(Continued)

(52) U.S. Cl.
CPC .............. *G06F 8/434* (2013.01); *G06F 8/423* (2013.01); *G06F 12/109* (2013.01); *G06F 8/41* (2013.01);
(Continued)

(58) Field of Classification Search
CPC ... G06F 8/30; G06F 8/41; G06F 8/423; G06F 8/427; G06F 8/433; G06F 8/443; G06F 8/445; G06F 8/447; G06F 9/45516
See application file for complete search history.

(56) References Cited

U.S. PATENT DOCUMENTS 6,049,667 A 4/2000 Bates
7,117,505 B2 10/2006 Lanzatella et al.
(Continued)

FOREIGN PATENT DOCUMENTS

CN 1869936 11/2006

OTHER PUBLICATIONS

Chakrabarti et al., "Atlas: Leveraging Locks for Non-volatile Memory Consistency", HP Laboratories, Apr. 2014, pp. 1-13; <http://www.hpl.hp.com/techreports/2013/HPL-2013-78.pdf>.*
(Continued)

*Primary Examiner* — Thuy Dao
*Assistant Examiner* — Ben C Wang
(74) *Attorney, Agent, or Firm* — Global IP Services, PLLC

(57) ABSTRACT

In one example implementation, a method for generating persistent pointers using non-volatile random access memory (NVRAM) compiler directives in a program for NVRAM based computing systems includes generating a program including modified variables. The modified variables include NVRAM compiler directives indicative of persistent pointer type. The method further includes generating assembly code, including persistent pointer enablers,
(Continued)

using the program including the modified variables by a compiler. Furthermore, the method includes mapping information of each NVRAM segment formed by the program with an associated physical address in NVRAM by an NVRAM driver residing in the NVRAM or main memory, maintaining an NVRAM registry including the mapped information by the NVRAM driver, determining valid virtual addresses of processes during runtime using the generated assembly code including the persistent pointer enablers and the NVRAM registry including the mapped information, and generating the persistent pointers from the valid virtual addresses during runtime.

13 Claims, 4 Drawing Sheets

(51) Int. Cl.
    *G06F 8/41*         (2018.01)
    *G06F 12/109*     (2016.01)
    *G06F 9/445*      (2018.01)

(52) U.S. Cl.
    CPC .............. *G06F 8/427* (2013.01); *G06F 8/447* (2013.01); *G06F 9/44505* (2013.01); *G06F 2212/1041* (2013.01); *G06F 2212/202* (2013.01); *G06F 2212/657* (2013.01)

(56) References Cited

U.S. PATENT DOCUMENTS

| | | | |
|---|---|---|---|
| 8,255,922 B1 | 8/2012 | Fresko et al. | |
| 8,583,893 B2 | 11/2013 | Pruthi et al. | |
| 2004/0123278 A1* | 6/2004 | Nanja | G06F 9/45516 717/153 |
| 2004/0215911 A1* | 10/2004 | Ouren | G06F 9/4418 711/170 |
| 2005/0246693 A1* | 11/2005 | Plum | G06F 8/41 717/140 |
| 2006/0167875 A1* | 7/2006 | Joe | G06F 8/30 |
| 2007/0033273 A1* | 2/2007 | White | G06F 8/30 709/223 |
| 2007/0033659 A1* | 2/2007 | Hoche | G06F 8/443 726/28 |
| 2007/0252812 A1* | 11/2007 | Keahey | G06Q 99/00 345/156 |
| 2008/0005719 A1* | 1/2008 | Morris | G06F 8/41 717/100 |
| 2008/0022265 A1* | 1/2008 | Morris | G06F 8/41 717/140 |
| 2012/0096052 A1* | 4/2012 | Tolia | G06F 11/1435 707/806 |
| 2013/0111151 A1 | 5/2013 | Sedlar et al. | |
| 2015/0169226 A1* | 6/2015 | Shen | G06F 12/0238 711/103 |
| 2016/0378679 A1* | 12/2016 | Cintra | G06F 12/1009 711/206 |
| 2017/0153972 A1* | 6/2017 | Mangalore | G06F 12/02 |
| 2018/0013579 A1* | 1/2018 | Fairweather | H04L 12/40032 |
| 2018/0039528 A1* | 2/2018 | Kumar | G06F 11/073 |

OTHER PUBLICATIONS

Zhang et al., "SIMPO: A Scalable In-Memory Persistent Object Framework Using NVRAM for Reliable Big Data Computing", ACM, Mar. 2018, pp. 7:1-7:28; <https://dl.acm.org/citation.cfm?id=3167972>.*

Xiao et al., "An Approach to Customization of Compiler Directives for Application-Specific Code Trasnformations", IEEE, Sep. 2014, pp. 99-106; <http://ieeexplore.ieee.org/stamp/stamp.jsp?tp=&arnumber=6949459>.*

International Searching Authority, The International Search Report and the Written Opinion, dated Nov. 4, 2014, 16 Pages.

Volos, H. et al.; Mnemosyne: Lightweight Persistent Memory, ASPLOS' 11, Mar. 5-11, 2011, 13 Pgs.

* cited by examiner

| 310 | 320 | 330 | 340 |
|---|---|---|---|
| NVRAM SEGMENT NAME | NVRAM SEGMENT NUMBER | NVRAM PFNs | ATTRIBUTES |
| STD | 1 | 10 | 80000000 |
| NVR1 | 10 | 100 | 80000000 |
FIG. 3 — 280
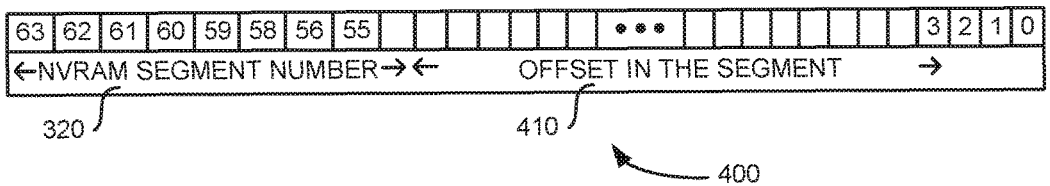
FIG. 4 — 400
| NVRAM SEGMENT NUMBER (320) | PROCESSBASE VA START | PROCESSBASE VA END |
|---|---|---|
| 1 | FFFFFFFF80000000 | FFFFFFFF80008000 |
| 10 | FFFFFFFF70000000 | FFFFFFFF70008000 |
|  |  |  |
FIG. 5 — 500

PERSISTENT POINTERS FOR PROGRAMS RUNNING ON NVRAM BASED COMPUTERS

BACKGROUND

Non-volatile solid state memory technologies, such as non-volatile random access memory (NVRAM) and the like, have been rapidly maturing in the recent years. Further, the NVRAM can be modeled as a block oriented device. In this case, programming modules are typically implemented using existing memory hierarchy, i.e., RAM ↔NVRAM based pseudo block devices. However, such implementation may need additional programming instructions to store the data onto the NVRAM based devices via a block mode interface.

Furthermore, NVRAM provides byte oriented access, and can be used as a temporary memory and/or as a persistent memory. This can facilitate a target program/application to access the data structures from the NVRAM. In addition, the data types used in existing computer programming languages may be easily ported to use NVRAM for storage other than for pointers.

Moreover, an emerging trend is to use NVRAMs as replacement to DRAMs in computers. Since NVRAMs have a property of persistence as well as byte addressability, they can be used to store data structures similar to the way it is done for DRAMs. For example, linked-lists may be saved as-is in a persistent manner to avoid rebuilding them upon power-up after a reboot or power-off.

BRIEF DESCRIPTION OF THE DRAWINGS

FIG. 3 depicts a block diagram of an example NVRAM registry format having mapping of physical frame numbers associated with an NVRAM segment.

FIG. 4 depicts an example 64 bit field format for NVRAM pointers that is used to implement example systems for generating NVRAM based persistent pointers using NVRAM compiler directives.

FIG. 5 depicts an example per process table generated for the mapping of the NVRAM segments into the process address spaces.

DETAILED DESCRIPTION

In the following description and figures, some example implementations of systems and/or methods for implementing persistent pointers in a process running on non-volatile random access memory (NVRAM) and/or dynamic random-access memory (DRAM) based computing systems using NVRAM compiler directives are described. Pointers embedded in the data structure during operation may not be valid after power-up and/or reboot. To overcome this, the embedded pointers need to be made valid across reboots/power cycles. Further, the embedded pointers are operating system process (for example, a running program on the system) dependent and may vary across operating system processes for the same memory location. Pointers indicate address of data structures, objects and/or functions. Further, pointers are typically values of addresses in virtual address spaces, which can range from minimum to maximum virtual addresses. Furthermore, pointers may be de-referenced to access data stored in an address location. This flexible but powerful construct may be used in implementing most of the basic data structures, such as trees, link lists and the like.

Various examples described below relate to generating NVRAM based persistent pointers to locations in an NVRAM using NVRAM compiler directives. The persistent pointers include an NVRAM segment identifier and an offset within an NVRAM segment. More specifically, the examples described below relate to a scheme of including NVRAM compiler directives in a source code to signal a compiler that the program variables would point to locations in NVRAM and has to be treated as persistent pointers. Furthermore, the examples described below relate to creation and storage of NVRAM addresses based on using NVRAM segment numbers and associated offset in the NVRAM segment and generating associated code by the compiler to map NVRAM segments calling into interfaces of an NVRAM driver in response to namespace directives and lookup of NVRAM pointers. The namespace directives are one of the NVRAM compiler directives. In addition, the examples described below generate code to convert NVRAM pointers (as shown in FIG. 4) into virtual addresses for each process. This mechanism ensures that NVRAM pointers are valid across reboots/power cycles and are valid across processes.

The terms "computing systems" and "computers" are used interchangeably throughout the document. Further, the terms "program", "computer program" and "user program" are being used interchangeably throughout the document. Furthermore, the term "process" refers to an instance of a computer program that is being executed. In addition, the term "user program including NVRAM compiler directives" refers to source code including NVRAM compiler directives. Moreover, the term "persistent pointer enabled user program" refers to persistent pointer enabled assembly code. Also, the terms "persistent pointers" and "NVRAM pointers" are used interchangeably throughout the document.

Figure 1:
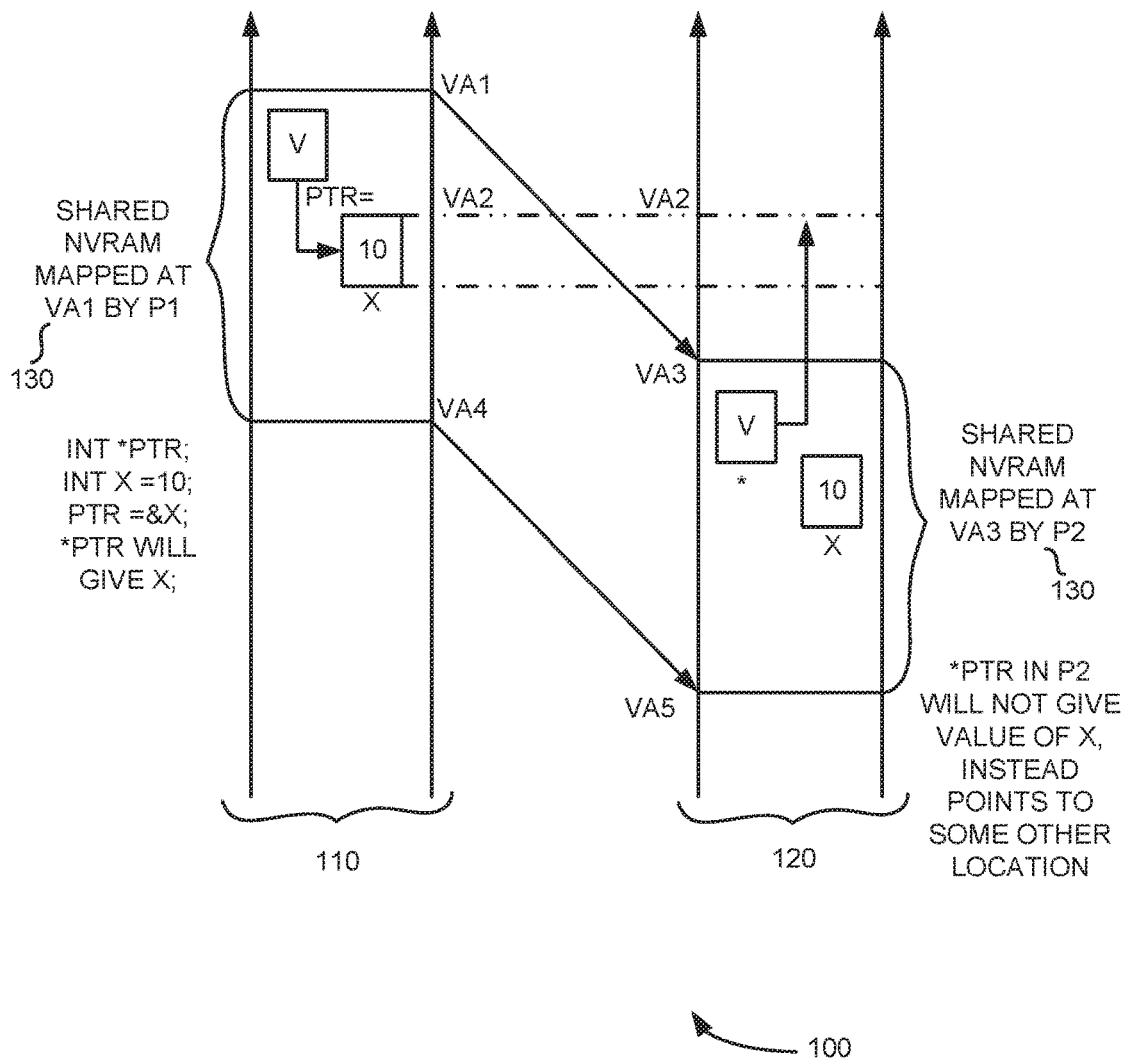
FIG. 1 is a block diagram depicting an example scenario of using/sharing pointers/virtual addresses in a data structure in a non-volatile random access memory (NVRAM) environment across two processes, in the context of the present subject matter.

FIG. 1 is a block diagram 100 depicting an example scenario of using pointers/virtual addresses in a data structure in an NVRAM environment across two processes. Referring to FIG. 1, the example scenario depicts a first process 110 for writing a binary data structure onto a portion of shared NVRAM memory 130. Since NVRAM segment is being mapped at a virtual address which is different from the first process, the written data structure may not be valid in the second process 120. Furthermore, if tree nodes in the data structure are saved and then reboot the computing system, then the pointers in the tree node may not be valid in both the first process 110 and the second process 120. Various examples described below enable the written data structure to be valid in processes across reboots.

Figure 2:
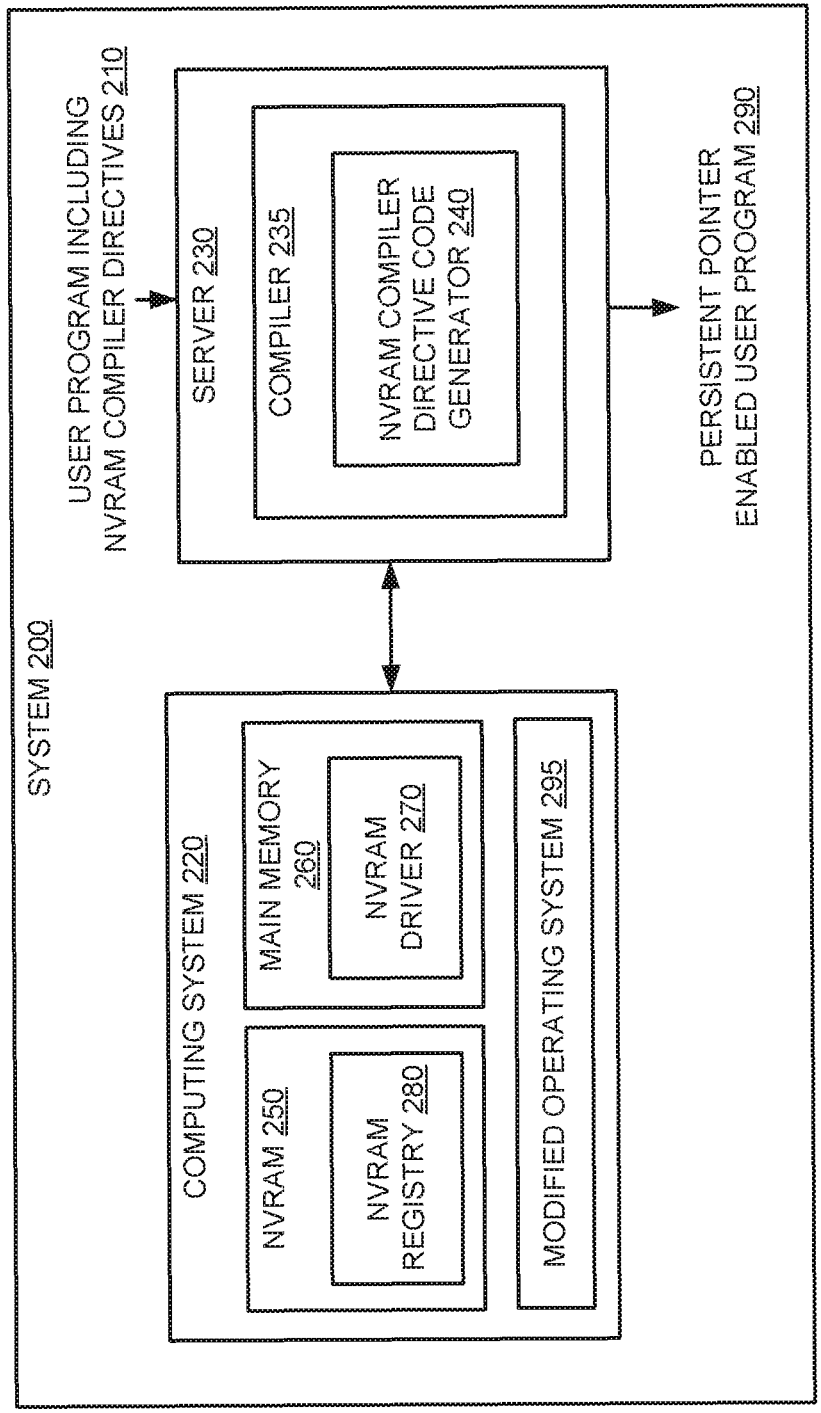
FIG. 2 is a block diagram depicting example modules used to implement example system for generating NVRAM based persistent pointers using NVRAM compiler directives.

FIG. 2 is a block diagram depicting an example system 200 for realizing implementation of persistent pointers in NVRAM based computing systems using NVRAM compiler directives to address the example scenario shown in FIG. 1. The example system 200 generally includes inputting a user program including NVRAM compiler directives 210 into a compiler 235 residing in a server 230 that is communicatively coupled to a computing system 220. In the example shown in FIG. 2, the compiler 235 is described as residing in the server 230; however the compiler 235 can also be implemented as part of the computing system 220.

Further, the compiler 235 includes an NVRAM compiler directive code generator 240. The computing system 220 includes an NVRAM 250 and a main memory 260. Example main memory is an NVRAM, DRAM and the like. Further, the main memory 260 includes an NVRAM driver 270. The NVRAM 250 includes an NVRAM registry 280.

In operation, the NVRAM compiler directive code generator 240 receives the user program including the NVRAM compiler directives 210 and generates persistent pointer enabled user program 290 for enabling persistent pointers upon encountering the NVRAM compiler directives in the user program 210 during runtime. The NVRAM compiler directive code generator 240 and the NVRAM driver 270 represent any combination of circuitry and executable instructions to generate code to support NVRAM compiler directives for enabling the persistent pointers.

In this case, the user program 210 including modified variables is generated. The modified variables include the NVRAM compiler directives that are indicative of a persistent pointer type. Example modified variables that can act as directives to treat the variable as an NVRAM pointer variable are as follows:

NVRAM NVR1:: int*x;

NVRAM int*y;

int z;

z=*x;

In the user program 210, modified variables are stored in NVRAM segments to direct the compiler 235 where a variable is to be created or should be looked up in a name space. The NVRAM segments are identified by a NVRAM segment name. When the compiler 235 encounters a construct similar to NVRAM segment NVR1::, the compiler 235 is configured to know that the variable is in the NVRAM segment named NVR1. If a segment name is not encountered, the compiler 235 presumes that the variable is in a pre-defined NVRAM segment "STD". Upon encountering these directives, the compiler 235 generates source code to map the respective NVRAM segments to the process. If the NVRAM segment already exists, then the NVRAM segment is mapped into the process address space.

The compiler directive code generator 240 then generates associated assembly code, including persistent pointer enablers, using the NVRAM segment name, segment id and other information in the registry 280 upon encountering the NVRAM compiler directives in the generated user program 210 during runtime. In one example, the NVRAM compiler directive code generator 240 generates the assembly code including NVRAM segment numbers and associated offset within the NVRAM segment to form the physical address that is stored in the NVRAM using the user program 230 including the modified variables.

One can envision that similar assembly code can be generated for other processor architectures. The above example assembly code reads current value of the pointer which has the offset from the base of the segment and segment identifier.

Further in operation, the NVRAM driver 270 maps the information of each NVRAM segment formed by the user program with an associated physical address in the NVRAM. For example, the information of each NVRAM segment includes a unique NVRAM segment name, segment identifier, physical address of a NVRAM page that is part of the NVRAM segment and other such attributes assigned to the NVRAM segment by an operating system. The NVRAM driver 270 then maintains an NVRAM registry including the mapped information.

Furthermore, the processes can carve out the NVRAM 250 into NVRAM segments, such as those shown in FIG. 1. The information associated with each NVRAM segment includes a unique NVRAM segment name 310 and an associated NVRAM segment number 320 as shown in an example NVRAM registry 280 in FIG. 3. Also, it can be seen in FIG. 3, the example NVRAM registry 280 maintains associated physical address. Example physical address includes physical frame numbers (PFNs) 330 in the NVRAM 250 and associated attributes 340. For example, the NVRAM registry 280 can be stored either in an allocated NVRAM segment or in an external persistent memory that is mapped to a pre-defined physical address. Example external persistent memory is an external disk drive. Also, the NVRAM driver can be configured to be a kernel loadable plug-in module.

The NVRAM driver 270 then maintains the NVRAM registry 280 including information of each NVRAM segment formed by the process running the user program 210 with an associated physical address in the NVRAM 250. Further, process interfaces may be realized as function codes to the NVRAM driver 270 so that the NVRAM driver 270 can manage allocation and de-allocation of the NVRAM 250 on the computing system 220. It can be envisioned that the NVRAM driver 270 can be modeled similar to a file system driver that facilitates shared memory in an operating system, such as a Linux.

As shown in an example persistent pointer format 400 of FIG. 4, persistent pointers include NVRAM segment number 320 and an associated NVRAM segment offset 410 in place of virtual/physical addresses in the process. The example persistent pointer format 400 shown in FIG. 4 is for a 64 bit field processor implementations, which can accommodate a 8 bit wide field for the NVRAM segment number 320 and the remaining 56 bit field may be used for offsets associated with about 256 unique NVRAM segments as shown in FIG. 4.

In this case, operating system 295 is modified to create a per-process table 500, as shown in FIG. 5, to maintain a mapping of the NVRAM segment numbers 320 to the base virtual address at which the segment is mapped for that process. This table 500 may be referred to as process NVRAM table (PROCNVRAMTBL). As shown in FIG. 5, the NVRAM segment number 320 is used to index the PROCNVRAMTBL. This process specific table 500 would have all the NVRAM segments mapped into the processes running the user program 210 (shown in FIG. 2). It can be seen that once the base virtual address for an NVRAM segment is extracted, the final virtual address may be obtained by adding the base virtual address to the offset in the NVRAM segment. The NVRAM segment number 320 can be obtained from the NVRAM registry 280, by indexing into the NVRAM registry 280 using the NVRAM segment name 310. Further, the operating system process management and executable image loading are configured to generate a process specific table, PROCNVRAMTBL, which would include the identification information of the NVRAM segments associated to that process and the process address where the NVRAM segments are mapped to.

Further as shown in FIG. 5, the NVRAM compiler directive code generator 240 (shown in FIG. 2) generates code that translates the assigned address into a segment identifier and an offset from the base of the NVRAM segment. The table 500 includes a mapping of the NVRAM segment number 320 to a corresponding virtual address used for:

obtaining the segment number 320 by locating an entry for which the assigned address minus base virtual address is positive and lowest across all other entities;

computing the offset by subtracting the base virtual address from the assigned address; and storing the NVRAM segment number and the offset in the NVRAM pointer.

Further as shown in FIG. 4, the NVRAM pointer includes NVRAM segment identification, such as NVRAM segment number and an offset. Furthermore, the compiler 235 (shown in FIG. 2) stores the NVRAM segment identification and the associated offset. The above technique works for pointers in a same NVRAM segment as well as pointers across NVRAM segments to make it persistent pointers.

Furthermore in operation, the NVRAM driver 270 determines valid virtual addresses of processes, during runtime, using the generated assembly code including the persistent pointer enablers and the NVRAM registry including the mapped information. Also, during the runtime, the NVRAM driver 270 then generates the persistent pointers from the valid virtual addresses.

In the discussion herein, the compiler directive code generator 240 and the NVRAM driver 270 of FIG. 2 have been described as a combination of circuitry and executable instructions. Such components can be implemented in a number of fashions. The executable instructions can be processor executable instructions, such as program instructions, stored on memory, such as the NVRAM 250 and/or main memory 260, which is a tangible, non-transitory computer readable storage medium, and the circuitry can be electronic circuitry, and computing system 220, for executing those instructions. The computing system 220, for example, can include one or multiple processors. The NVRAM 250 can store program instructions which enable support for persistent pointers as a result of the code generated by the NVRAM compiler directive code generator 240, that when executed by the computing system 220 implements persistent pointer support which enables the persistent pointers residing in the NVRAM 250 to be valid across reboots and valid across processes. The NVRAM 250 and/or main memory 260 can be integrated in the same computing system 220 or it can be in a separate computing system that is accessible to the computing system 220.

In one example, the executable instructions can be part of an installation package that when installed can be executed by the computing system 220 to implement the system 200. In that example, the memory resource in the computing system can also be a portable medium such as a CD, a DVD, a flash drive, or memory maintained by a computer device from which the installation package can be downloaded and installed. In another example, the executable instructions can be part of an application or applications already installed. Here, the memory resource in the computing system 220 can include integrated memory such as a drive, NVRAM, DRAM or the like.

Referring now to FIG. 2, the NVRAM compiler directive code generator 240 and the NVRAM driver 270 can be stored in a same computing system or distributed across servers, other devices or storage mediums, or a combination thereof. For example, an instance of the NVRAM compiler directive code generator 240 can be executing on each one of the processor resources of the server devices. The engines and/or modules can complete or assist completion of operations performed in describing another engine and/or module. The engines, drivers and/or modules can perform the example methods described in connection with FIG. 6.

Figure 6:
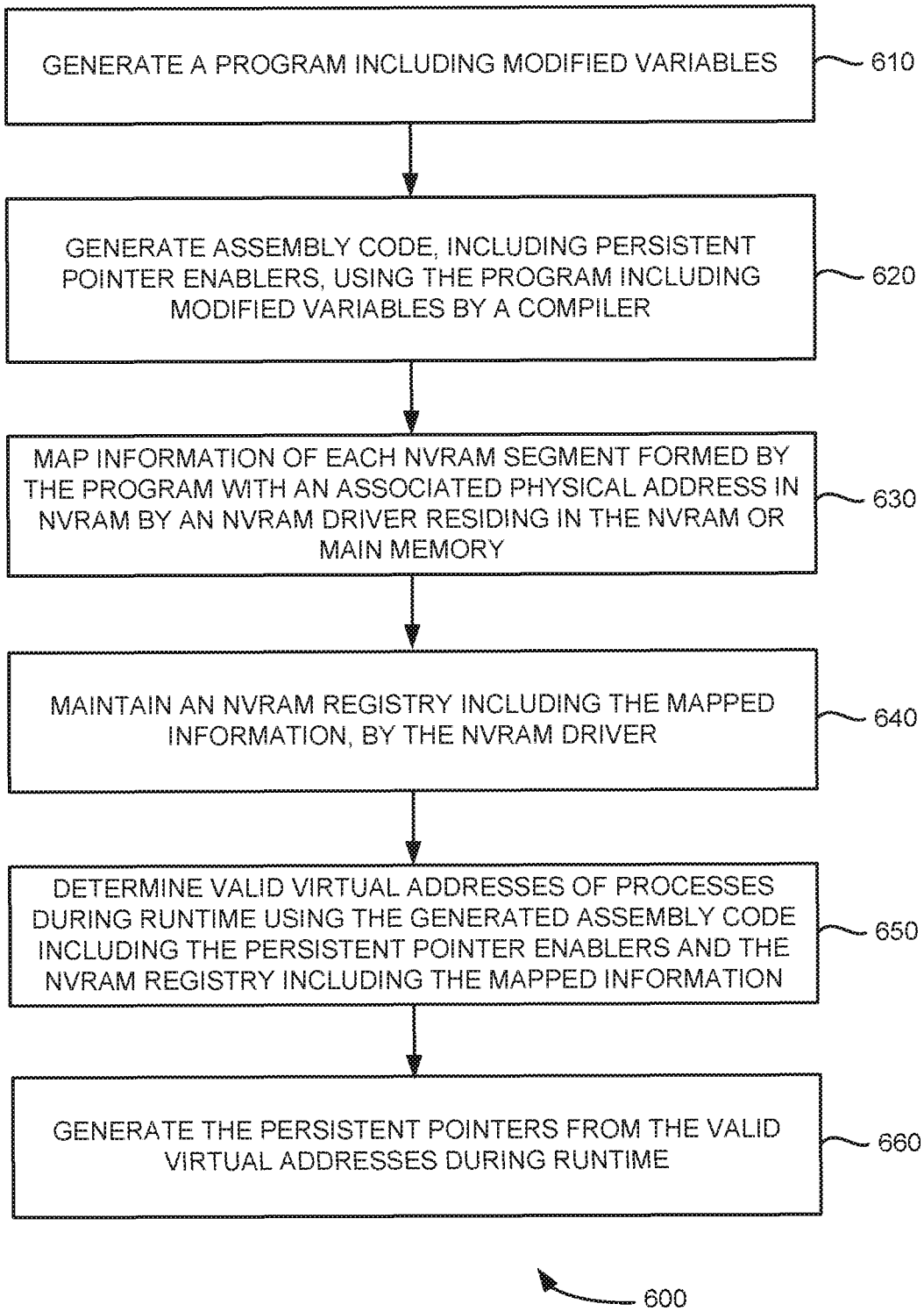
FIG. 6 is a flow diagram depicting an example method for generating NVRAM based persistent pointers using NVRAM compiler directives.

FIG. 6 is a flow diagram 600 depicting an example method for implementing persistent pointers in a user program that can run in an NVRAM based computing systems. Referring to FIG. 6, example methods for implementing persistent pointers that is based on NVRAM compiler directives in a program.

At block 610, a program including modified variables is generated. The modified variables include NVRAM compiler directives indicative of persistent pointer type. At block 620, assembly code including persistent pointer enablers is generated using the program including modified variables by a compiler. At block 630, information of each NVRAM segment formed by the program is mapped with an associated physical address in an NVRAM by an NVRAM driver. The NVRAM driver can reside in the NVRAM, DRAM and the like. At block 640, an NVRAM registry including the mapped information is maintained by the NVRAM driver. At block 650, valid virtual addresses of processes are determined during runtime using the generated assembly code including the persistent pointer enablers and the NVRAM registry including the mapped information. The process is an instance of a computer program that is being executed. At block 660, the persistent pointers are generated, during runtime, from the valid virtual addresses. The persistent pointers include an NVRAM segment identifier and an offset of a location within an NVRAM segment. The persistent pointers point to the offset of the location.

The method associated with the flow diagram 600 of FIG. 6 is explained in more detail with reference to FIGS. 1-5 above. Although the flow diagram of FIG. 6 illustrates specific orders of execution, the order of execution can differ from that which is illustrated. For example, the order of execution of the blocks can be scrambled relative to the order shown. Also, the blocks shown in succession can be executed concurrently or with partial concurrence. All such variations are within the scope of the present subject matter.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the invention that is defined in the following claims.

We claim:

1. A method for generating persistent pointers using NVRAM compiler directives in a program for non-volatile random access memory (NVRAM) based computing systems, comprising:

generating a program including modified variables, wherein the modified variables include NVRAM compiler directives indicative of persistent pointer type;

generating assembly code, including persistent pointer enablers, using the program including the modified variables by a compiler;

mapping information of each NVRAM segment formed by the program with an associated physical address in an NVRAM by an NVRAM driver residing in the NVRAM or main memory;

maintaining an NVRAM registry including the mapped information, by the NVRAM driver;
determining valid virtual addresses of processes during runtime using the generated assembly code including the persistent pointer enablers and the NVRAM registry including the mapped information; and
generating, during runtime, the persistent pointers from the valid virtual addresses using the generated assembly code, wherein the information of each NVRAM segment comprises a unique NVRAM segment name, segment identifier, physical address of a NVRAM page that is part of the respective NVRAM segment and attributes assigned to the respective NVRAM segment by an operating system.

2. The method of claim 1, wherein generating the assembly code, including persistent pointer enablers, using the program including the modified variables comprises:
generating the assembly code, including NVRAM segment numbers and associated offset within the NVRAM segment to form the persistent pointer that is stored in the NVRAM, using the program including the modified variables;
calling process interfaces of the NVRAM driver to map NVRAM segments containing the modified variables; and
generating the virtual addresses of the processes from the physical addresses and vice-versa.

3. The method of claim 1, comprising:
storing the NVRAM registry in an NVRAM segment or in an external persistent memory that is mapped to a pre-defined physical address.

4. The method of claim 1, wherein the NVRAM driver is a kernel loadable plug-in module.

5. A system for generating persistent pointers using non-volatile random access memory (NVRAM) compiler directives in a program for NVRAM based computing systems comprising:
a server; and
a computing system communicatively coupled to the server, wherein the computing system comprises:
an NVRAM; and
a main memory that is communicatively coupled with the NVRAM, wherein the NVRAM includes an NVRAM registry, wherein an NVRAM driver resides in the main memory or the NVRAM, wherein the server includes a compiler, and wherein the compiler includes an NVRAM compiler directive code generator to:
generate a program including modified variables, wherein the modified variables include NVRAM compiler directives indicative of persistent pointer type;
generate assembly code, including persistent pointer enablers, using the program including the modified variables, by the NVRAM compiler directive code generator;
map information of each NVRAM segment formed by the program with an associated physical address in the NVRAM by the NVRAM driver;
maintain the NVRAM registry including the mapped information, by the NVRAM driver;
determine valid virtual addresses of processes during runtime using the generated assembly code including the persistent pointer enablers and the NVRAM registry including the mapped information, by the NVRAM driver; and
generate the persistent pointers from the valid virtual addresses during runtime, by the generated assembly code.

6. The system of claim 5, wherein the information of an NVRAM segment comprises a unique NVRAM segment name, segment identifier, physical address of a NVRAM page that is part of the NVRAM segment and attributes assigned to the NVRAM segment by an operating system.

7. The system of claim 5, further configured to:
generating the assembly code, including NVRAM segment numbers and associated offset within the NVRAM segment to form the persistent pointer that is stored in the NVRAM, using the program including the modified variables;
calling process interfaces of the NVRAM driver to map NVRAM segments containing the modified variables; and
generating the virtual addresses of the processes from the physical addresses and vice-versa.

8. The system of claim 5, further configured to:
storing the NVRAM registry in an NVRAM segment or in an external persistent memory that is mapped to a pre-defined physical address.

9. The system of claim 5, wherein the NVRAM driver is a kernel loadable plug-in module.

10. The system of claim 5, wherein the main memory comprises an NVRAM and/or DRAM.

11. A non-transitory computer readable storage medium comprising a set of instructions executable by at least one processor resource to:
generate a program including modified variables, wherein the modified variables include non-volatile random access memory (NVRAM) compiler directives indicative of persistent pointer type;
generate assembly code, including persistent pointer enablers, using the program including the modified variables by a compiler;
map information of each NVRAM segment formed by the program with an associated physical address in an NVRAM by an NVRAM driver residing in the NVRAM or main memory;
maintain an NVRAM registry including the mapped information, by the NVRAM driver;
determine valid virtual addresses of processes during runtime using the generated assembly code including the persistent pointer enablers and the NVRAM registry including the mapped information; and
generate persistent pointers from the valid virtual addresses during runtime using the generated assembly code
wherein the information of each NVRAM segment comprises a unique NVRAM segment name, segment identifier, physical address of a NVRAM page that is part of the respective NVRAM segment and attributes assigned to the respective NVRAM segment by an operating system.

12. The non-transitory computer readable storage medium of claim 11, wherein generating the assembly code, including persistent pointer enablers, using the program including the modified variables comprises:
generating the assembly code, including NVRAM segment numbers and associated offset within the NVRAM segment to form the persistent pointer that is stored in the NVRAM, using the program including the modified variables;

calling process interfaces of the NVRAM driver to map NVRAM segments containing the modified variables; and generate the virtual addresses of the processes from the physical addresses and vice-versa.

13. The non-transitory computer readable storage medium of claim 11, comprising:

storing the NVRAM registry in an NVRAM segment or in an external persistent memory that is mapped to a pre-defined physical address.

* * * * *